Figure 1:
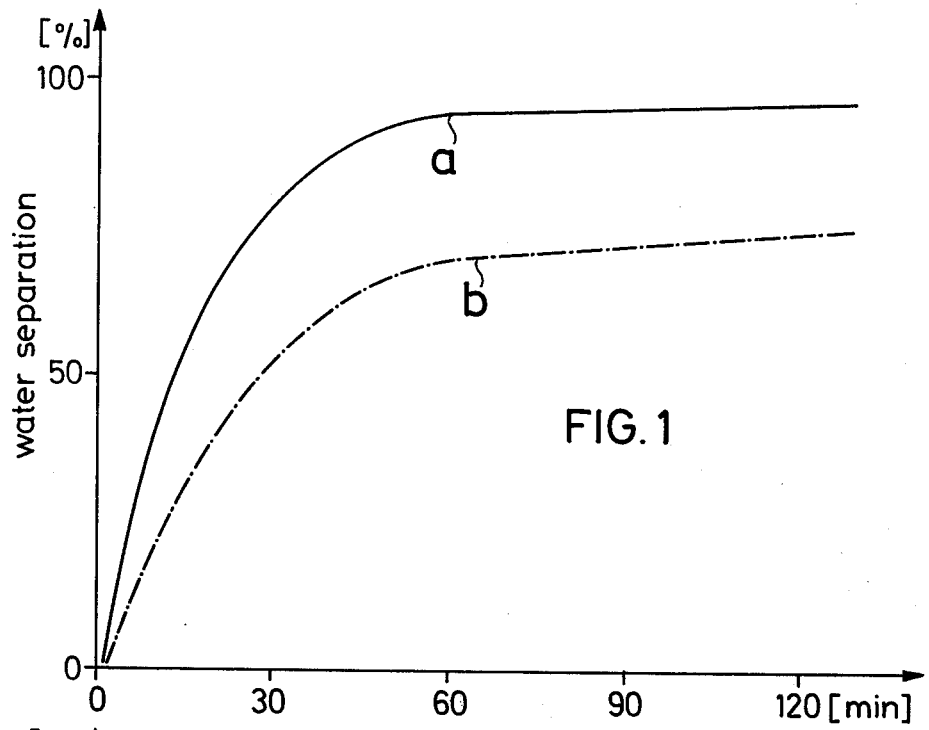

United States Patent [19]

Macenka et al.

[11] 4,117,031
[45] Sep. 26, 1978

[54] CRUDE OIL DEMULSIFIERS

[75] Inventors: Johannes Macenka, Burgkirchen, Alz; Manfred Fischer, Burgkirchen-Holzen; Fritz Joachim Gohlke, Altötting, all of Fed. Rep. of Germany

[73] Assignee: Hoechst Aktiengesellschaft, Frankfurt am Main, Fed. Rep. of Germany

[21] Appl. No.: 615,462

[22] Filed: Sep. 22, 1975

[30] Foreign Application Priority Data

Sep. 26, 1974 [DE] Fed. Rep. of Germany ....... 2445873

[51] Int. Cl.$^2$ .............................................. C08L 61/06
[52] U.S. Cl. .................................... 260/838; 252/331; 252/358; 528/130; 528/129; 260/876 B
[58] Field of Search ............... 260/838, 58, 59, 876 B; 252/331, 358

[56] References Cited

U.S. PATENT DOCUMENTS

| 2,574,543 | 11/1951 | De Groote et al. ............. 260/838 X |
| 2,674,619 | 4/1954 | Lundsted .................... 260/30.8 R X |
| 2,679,484 | 5/1954 | De Groote ...................... 260/838 X |
| 2,679,485 | 5/1954 | De Groote ...................... 260/838 X |
| 2,679,486 | 5/1954 | De Groote ...................... 260/838 X |
| 2,679,488 | 5/1954 | De Groote ...................... 260/838 X |
| 2,695,887 | 11/1954 | De Groote ...................... 260/838 X |
| 2,695,888 | 11/1954 | De Groote ...................... 260/838 X |
| 2,695,889 | 11/1954 | De Groote ...................... 260/838 X |
| 3,042,625 | 7/1962 | Kirkpatrick et al. ............ 260/838 X |
| 3,278,637 | 10/1966 | Kirkpatrick et al. ................ 260/838 |
| 3,725,349 | 4/1973 | Smith et al. ............................. 260/58 |
| 4,032,514 | 6/1977 | Buriks et al. ................... 260/59 R X |

OTHER PUBLICATIONS

Robert W. Martin, The Chemistry of Phenolic Resins, (Wiley, 1956), p. 97, [TP 978 M38].

Primary Examiner—Thomas De Benedictis, Sr.
Attorney, Agent, or Firm—Connolly and Hutz

[57] ABSTRACT

A condensation product obtained by first preparing
a. an addition product of aliphatic aldehydes and phenol in a molar ratio of about 1 : 1 to 3 : 1, at temperatures in the range of from about 50° to 80° C, in the presence of an alkaline catalyst, and separately therefrom
b. a block polymer, obtained from a polypropylene glycol having a molecular weight from about 1500 to 2500 by the addition of about 30 to 50% by weight of ethylene oxide in the presence of an alkaline catalyst, and subsequently
c. condensing about 0.5 to 4 moles of a) with 1 mole of b), after previous neutralization, if necessary in the presence of inert solvents, at 80° to 150° C, and removing the reaction water formed, and its use as demulsifying agent for the separation of water from crude oil emulsions.

3 Claims, 3 Drawing Figures

CRUDE OIL DEMULSIFIERS

The present invention relates to products which are obtained by first preparing
  a. an addition product of an aliphatic aldehyde and phenol in a molar ratio of 1 : 3 to 3 : 1, preferably 1.8 : 1 to 2.2 : 1, preferably at temperatures in the range of from about 50° C to 80° C in the presence of an alkaline catalyst,
and separately therefrom
  b. a block polymer, obtained from polypropylene glycols having molecular weights of from 1500 to 2500, preferably 1700 to 2200, by the addition of 30 to 50% by weight, preferably 35 to 40% by weight, of ethylene oxide in the presence of alkaline catalysts,
and subsequently
  c. condensing about 0.5 to 4 moles of a) with 1 mole of b), after previous neutralization, if necessary in the presence of an inert solvent, at about 80° to 150° C, preferably at 100° to 130° C, and removing the reaction water formed.

Furthermore, the invention relates to the use of the above-described products for the dissociation and demulsification of crude oil emulsions.

Crude oil emulsions are intimate mixtures of liquids that are not miscible with one another, crude oil and water. The water is dispersed in very fine droplets in the crude oil and the emulsion is stabilized in such a manner by the "natural" emulsifiers, which it also contains and which are enriching on the border surfaces, that both phases cannot be separated in economical manner by a simple settling process.

In order to dissociate such emulsions, the industry has used, in addition to simple heating to about 80° C and centrifugation or application of electric tension fields, in the last years surface-active compounds, so-called demulsifiers, which are added in small amounts to the stationary or flowing emulsion.

Among the great number of substances proposed for this purpose, the following types of compounds have been used in practice:

1. block polymers of propylene oxide and ethylene oxide, as those obtained by the addition of ethylene oxide to polypropylene glycols (U.S. Pat. No. 2,674,619 and German Offenlegungsschrift No. 1,018,179), 2. alkyl-phenol resins which are soluble in organic solvents and the free hydroxy groups of which are subsequently reacted with ethylene oxide and/or propylene oxide (U.S. Pat. Nos. 2,499,368; 2,499,370; 2,524,889; 2,560,333 and 2,574,543), 3. reaction products of the block polymers described under 1) or mixtures of water-soluble and water-insoluble polyalkylene glycols with aliphatic or aromatic di-isocyanates (German Pat. No. 1,127,082 and German Auslegeschrift No. 1,495,827), 4. products which are formed by the reaction of the substances described under 1) and 2) with dicarboxylic acids or their anhydrides, such as di-glycolic acid and maleic acid anhydride (U.S. Pat. Nos. 3,202,614 and 3,202,615), 5. reaction products of di-isocyanates with addition products of mixtures of polyethylene glycols and hydrophobic polyalkylene glycols with di-isocyanates or addition products of ethylene oxide and water-insoluble polyalkylene glycols and condensation products of bifunctional mono-alkyl-phenols which contain linear or branched alkyl groups in ortho and para-position, with aldehydes the free hydroxy groups of which have been further reacted with epoxides (German Pat. No. 1,642,825).

The above-mentioned demulsifiers have more or less strong disadvantages and they comply with the requirements partly only. Either with spontaneous initial dissociation the total separation is poor and the separation of salt is moderate or the dissociation proceeds too slowly although the separation of salt and water is good. Sometimes, however, their use is bound specifically to a few types of oil.

Now, we have found that the products described in the introduction have considerable advantages over the demulsifiers used hitherto, i.e. that they provoke, with rapid initial dissociation, high rates of separation with a very good separation of salt without it being necessary to additionally supply heat.

The pre-products described under a) are prepared in known manner by the addition of low aliphatic aldehydes, for example formaldehyde, para-formaldehyde, acetaldehyde, and phenol in the presence of alkaline catalysts at temperatures of about 50° to 80° C. It is only important that these temperatures are not significantly surpassed, since otherwise further condensations lead to resol- or novolack-like products with loss of hydroxy groups. The molar ratio of phenol to aldehyde shall amount to 1 : 1 to 1 : 3, preferably 1 : 1.8 to 1 : 2.2 (Angew. Chemie 70, 390-398 (1958)). As alkaline catalysts, there may be used sodium hydroxide solution, potassium hydroxide solution, calcium hydroxide and tertiary amines, for example triethylamine.

The preparation of the pre-products described under b) is effected in known manner by the addition of ethylene oxide and polypropylene glycols in the presence of alkaline catalysts, in particular alkali metal hydroxides such as potassium hydroxide, or sodium hydroxide. In this case, polypropylene glycols are used which have a molecular weight of from about 1500 to 2500, preferably from 1700 to 2200, and these compounds are reacted with about 30 to 50% by weight, preferably from 35 to 40% by weight, of ethylene oxide, calculated on polypropylene glycol (U.S. Pat. No. 2,674,619 and German Auslegeschrift No. 1,018,179).

The subsequent etherification of the alkaline reaction products described under a) and b) is effected after a previous neutralization with suitable acids, optionally in the presence of inert solvents, at a reaction temperature of from about 80° to 150° C, preferably from 100° to 130° C, with simultaneous elimination of the reaction water formed, for example by applying a vacuum or by azeotropic distillation. Generally, about 0.5 to 4 moles of the product described under a) are reacted with 1 mole of the product described under b). For the neutralization, mineral acids, for example hydrochloric acid, sulfuric acid and phosphoric acid, as well as organic acids such as acetic acid may be used. The acid is mainly selected according to economical points of view.

The preparation of the demulsifiers of the invention is effected, depending on the respective circumstances, with inert solvents such as water, alcohols, for example methanol, isopropanol or isobutanol, furthermore with aromatic hydrocarbons such as benzene, toluene or xylene, or with commercial solvents such as "Solvent naphtha" (a mixture of higher aromatic compounds).

The demulsifiers of the invention are used in an amount varying according to the purpose of application and being in the range of from about 2 to 100 ppm, preferably from 5 to 50 ppm.

The starting and the final products are specified by characteristic values, for example the alkali number, the hydroxy number, the determination of the turbidity point and the measurement of the viscosity.

The following Examples serve to illustrate the invention.

EXAMPLE 1

1 Mole of phenol was stirred, in the presence of 0.15 mole of sodium hydroxide solution, with 2 moles of formaldehyde (in form of a 35% aqueous solution), at a temperature of from 50° to 80° C, until no free formaldehyde could be detected any more. A reddish brown product was obtained which was well soluble in water (product a1). Analogous results were obtained when the corresponding amount of potassium hydroxide solution was used.

By an independent reaction, polypropylene glycol having an average molecular weight of from 2000 to 2200 was reacted in known manner with 38% by weight of ethylene oxide in the presence of potassium hydroxide, in which process a viscous final product of light colour was obtained (product b1).

5000 Parts by weight of product b1) were mixed with 980 parts by weight of product a1) and were neutralized with phosphoric acid. Up to a temperature of from 80° to 85° C, the water was distilled off from the formaldehyde solution in vacuo, and subsequently the etherification was started by increasing the reaction temperature to 100° to 140° C, in which process the water formed was removed in vacuo. A reddish brown viscous product was obtained which was soluble in solvents such as alcohols or hydrocarbons. Analogous results were obtained, if the water was extracted by azeotropic distillation after having added an inert solvent.

Figure 2:
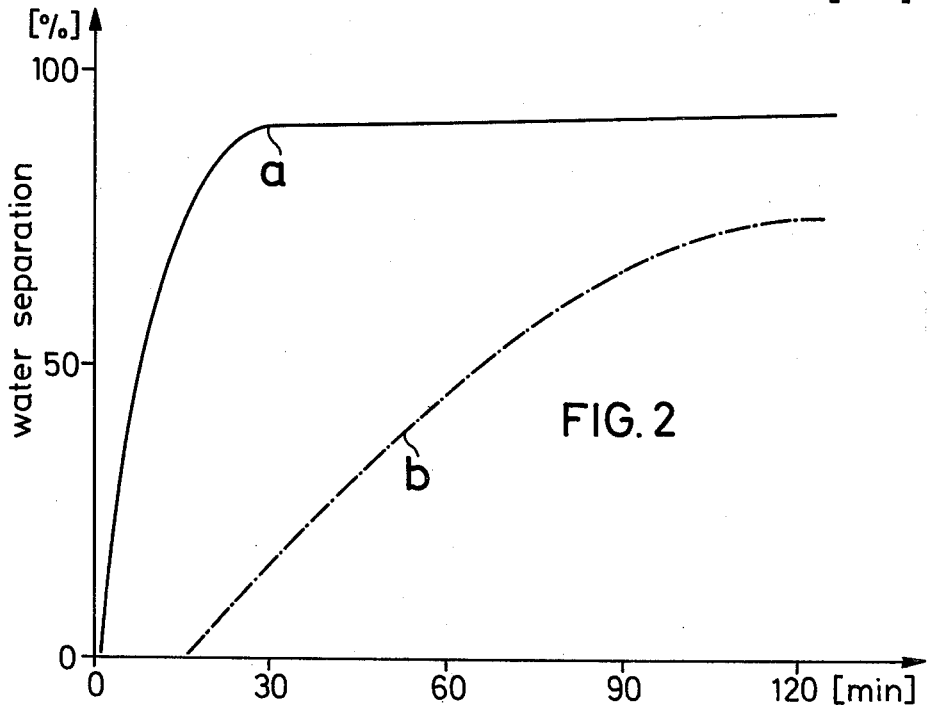

The demulsification diagrams shown by FIGS. 1 and 2 of the accompanying drawings show the demulsification capability of this product, if 20 and 5 ppm, respectively, were added in one case to a crude oil from the subalpine region, and in another case to a crude oil which was drawn out in the region between the Weser and the Ems, as compared to a cross-linked resin demulsifier according to German patent specification No. 1,642,825.

Also with respect to foreign crude oil emulsions, for example a crude oil from Iran having a water content of 28%, the demulsifiers of the invention were found to be considerably more effective than demulsifying agents of a known constitution, as may be seen from the following comparison.

| | Demulsifying temperature 54° C | | | |
|---|---|---|---|---|
| | Amount applied | Water separation in % | | Residual emulsion | Residual salt content in |
| Type of demulsifier | ppm | 3 h | 12 h | % | PTB+ |
| Block polymer according to U.S. Pat. Application No. 2 674 619 | 27 | 4 | 20 | 54 | 12 300 |
| Resin demulsifier cross-linked according to German Patent Spec. No. 1 642 825 | 27 | 8 | 26 | 45 | 19 200 |
| Demulsifier according to Example 1 of the present Application | 27 | 8 | 94 | 1 | 60 |

| | Demulsifying temperature 54° C | | | |
|---|---|---|---|---|
| | Amount applied | Water separation in % | | Residual emulsion | Residual salt content in |
| Type of demulsifier | ppm | 3 h | 12 h | % | PTB+ |
| Blank value | 0 | 5 | 12 | 45 | 24 000 |
| Butylphenol resin-oxalkylate + 2 moles of EO* according to the present Application, page 3, No. 2 | 18 | — | 7 | separating layer not sharp | 24 000 |
| Demulsifier according to Example 1 of the present Application | 18 | — | 85 | sharp | 200 |
| Blank value | — | — | 7 | not sharp | 24 000 |
| Butylphenol resin-oxalkylate + 2 moles of EO* according to the present Application, page 3, No. 2 | 36 | — | 14 | not sharp | 21 800 |
| Demulsifier according to Ex. 1 of the present Application | 36 | — | 98 | sharp | 70 |
| Blank value | — | — | 7 | not sharp | 24 000 |

+PTB = pounds per 1000 barrels
*EO = ethylene oxide

EXAMPLE 2

5000 Parts by weight of product b1) of Example 1 were mixed with 370 parts by weight of product a1) of Example 1 and neutralized as described in Example 1. The water which was present was removed at a temperature of from 80° to 85° C in vacuo. The subsequent etherification was carried out at 130° to 150° C, the water being removed in vacuo. It could also be eliminated by azeotropic distillation with the aid of an inert solvent. A reddish brown viscous product was obtained.

Figure 3:
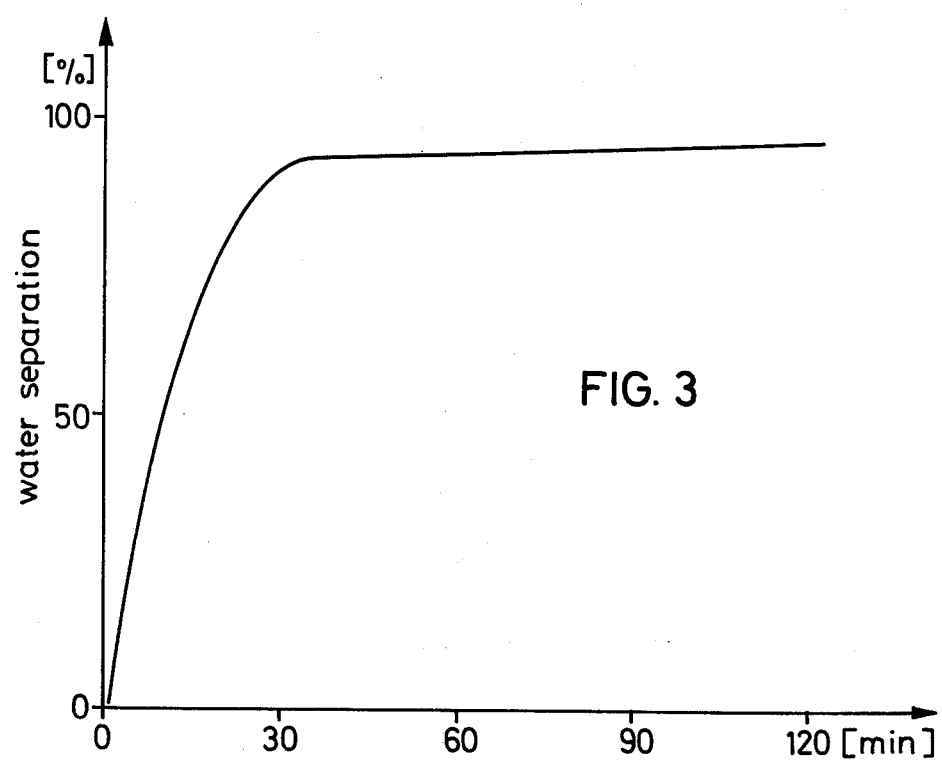

The demulsification diagram of FIG. 3 of the accompanying drawing shows its good effectiveness, when 20 ppm were used for a crude oil drawn out in the region north of the Elbe and which is difficult to demulsify.

EXAMPLE 3

Polypropylene glycol having an an average molecular weight of from 1700 to 1800 was reacted in known manner with 30% by weight of ethylene oxide. In this process a light yellow product was obtained (b2).

3000 Parts by weight of product b2) were mixed with 812 parts by weight of product a1) of Example 1) and neutralized with hydrochloric acid. The water which was present was eliminated in vacuo at a temperature of from 80° to 85° C. Subsequently, the etherification was carried out in vacuo at a temperature of from 120° to 130° C, in which process a reddish brown product was obtained which had a viscosity of from 900 to 1000 cP at 50° C. The product was well soluble in the common solvents.

The following comparison shows the activity of this demulsifier as compared against a cross-linked resin demulsifying agent, when 30 and 20 ppm, respectively, were used for a crude oil drawn out in the region near the mouth of the river Ems.

| Demulsifying temperature 30° C |
|---|
| Amount applied 30 ppm |

-continued

| Demulsifying temperature 30° C | | | | | | | | |
|---|---|---|---|---|---|---|---|---|
| | Time | | | | | | | |
| Type of demulsifier | 10' | 30' | 60' | 90' | 120' | 180' | 240' | 360' |
| Demulsifier according to German Patent Specification No. 1 642 825 | — | — | 1 | 2 | 13 | 27 | 38 | 50 |
| Demulsifier according to Example 3 of the present Application | 1 | 2 | 3 | 7 | 33 | 83 | 88 | 95 |
| Amount applied 20 ppm | | | | | | | | |
| Demulsifier according to German Patent Specification No. 1 642 825 | — | — | — | — | 0.5 | 1 | 6.5 | 7.5 |
| Demulsifier according to Example 3 of the present Application | — | — | 2 | 17 | 75 | 92 | 95 | 97 |

We claim:

1. A condensation product obtained by first preparing
   a. an addition product of aliphatic aldehydes and phenol in a molar ratio of about 1 : 1 to 3 : 1, at temperatures in the range of from about 50° to 80° C, in the presence of an alkaline catalyst,
   and separately therefrom
   b. a block polymer, obtained from a polypropylene glycol having a molecular weight from about 1500 to 2500 by the addition of about 30 to 50% by weight of ethylene oxide in the presence of an alkaline catalyst,
   and subsequently
   c. condensing about 0.5 to 4 moles of a) with 1 mole of b), after previous neutralization, if necessary in the presence of inert solvents, at 80° to 150° C, and removing the reaction water formed.

2. A condensation product as claimed in claim 1, wherein the molar ratio for preparing addition product (a) is 1.8 : 1 to 2.2 : 1.

3. A condensation product as claimed in claim 1, wherein the block polymer (b) is prepared from a polypropylene glycol having a molecular weight of from 1700 to 2200 and 35 to 40% by weight of ethylene oxide.

* * * * *